(12) United States Patent
Bayramoglu et al.

(10) Patent No.: US 9,563,315 B2
(45) Date of Patent: Feb. 7, 2017

(54) CAPACITIVE TOUCH PANEL AND METHOD FOR PRODUCING THE SAME

(75) Inventors: Gokalp Bayramoglu, Xiamen (CN); Yu-Ying Chen, Sanchong (TW)

(73) Assignee: TPK TOUCH SOLUTIONS INC., Taipei (TW)

( * ) Notice: Subject to any disclaimer, the term of this patent is extended or adjusted under 35 U.S.C. 154(b) by 98 days.

(21) Appl. No.: 12/942,037

(22) Filed: Nov. 9, 2010

(65) Prior Publication Data

US 2012/0113042 A1 May 10, 2012

(51) Int. Cl.
 *G06F 3/044* (2006.01)

(52) U.S. Cl.
 CPC .......... *G06F 3/044* (2013.01); *Y10T 29/49002* (2015.01)

(58) Field of Classification Search
 USPC .......................................... 345/173, 174, 178
 See application file for complete search history.

(56) References Cited

U.S. PATENT DOCUMENTS

| | | | |
|---|---|---|---|
| 6,137,427 A | 10/2000 | Binstead | |
| 6,188,391 B1 | 2/2001 | Seely et al. | |
| 6,814,452 B2 | 11/2004 | Kusuda | |
| 6,819,316 B2 | 11/2004 | Schulz et al. | |
| 7,339,579 B2 | 3/2008 | Richter et al. | |
| 7,439,962 B2 | 10/2008 | Reynolds et al. | |
| 8,115,751 B2 | 2/2012 | Lin et al. | |
| 2001/0043046 A1* | 11/2001 | Fukunaga | 315/160 |
| 2004/0141110 A1 | 7/2004 | Yu et al. | |
| 2004/0160424 A1 | 8/2004 | Bottari et al. | |
| 2005/0073507 A1 | 4/2005 | Richter et al. | |
| 2006/0272850 A1* | 12/2006 | Morimoto et al. | 174/254 |
| 2006/0274055 A1 | 12/2006 | Reynolds et al. | |
| 2007/0165004 A1 | 7/2007 | Seelhammer et al. | |
| 2008/0136791 A1 | 6/2008 | Nissar | |
| 2008/0142352 A1 | 6/2008 | Wright | |
| 2008/0165139 A1* | 7/2008 | Hotelling | G06F 3/041 345/173 |
| 2008/0165158 A1 | 7/2008 | Hotelling et al. | |
| 2008/0264699 A1* | 10/2008 | Chang et al. | 178/18.01 |
| 2009/0091546 A1* | 4/2009 | Joo et al. | 345/173 |
| 2009/0102814 A1 | 4/2009 | Lin et al. | |
| 2009/0146967 A1* | 6/2009 | Ino et al. | 345/173 |
| 2009/0160824 A1* | 6/2009 | Chih-Yung et al. | 345/175 |

(Continued)

FOREIGN PATENT DOCUMENTS

| | | |
|---|---|---|
| CN | 201078769 | 6/2008 |
| CN | 101504496 | 8/2009 |

(Continued)

*Primary Examiner* — William Boddie
*Assistant Examiner* — Bryan Earles
(74) *Attorney, Agent, or Firm* — Cooper Legal Group, LLC

(57) ABSTRACT

The present invention is directed to a capacitive touch panel, which primarily includes a singular substrate, a mask layer formed on a border region of the singular substrate, a capacitive sensing layer comprising a plurality of first-axis conductor assemblies and a plurality of second-axis conductor assemblies, wherein the singular substrate, the mask layer and the capacitive sensing layer are integrally formed, and insulated auxiliary medium filled in gaps between the first-axis conductor assemblies and the second-axis conductor assemblies, wherein the refractive index of the auxiliary medium matches the refractive index of the capacitive sensing layer.

26 Claims, 13 Drawing Sheets

(56) References Cited

U.S. PATENT DOCUMENTS

| | | | |
|---|---|---|---|
| 2009/0207151 A1* | 8/2009 | Liu et al. | 345/174 |
| 2009/0278815 A1* | 11/2009 | Li et al. | 345/174 |
| 2010/0141608 A1 | 6/2010 | Huang et al. | |
| 2010/0182250 A1 | 7/2010 | Kang et al. | |
| 2010/0231543 A1* | 9/2010 | Momose | 345/173 |
| 2010/0265187 A1* | 10/2010 | Chang et al. | 345/173 |
| 2010/0265193 A1* | 10/2010 | Kung | G06F 3/044 345/173 |
| 2010/0302206 A1* | 12/2010 | Yu et al. | 345/174 |
| 2010/0321327 A1* | 12/2010 | Liu | 345/174 |
| 2011/0069033 A1* | 3/2011 | Meng | G06F 3/044 345/174 |
| 2011/0090171 A1* | 4/2011 | Chen et al. | 345/174 |
| 2011/0096025 A1* | 4/2011 | Slobodin et al. | 345/174 |
| 2011/0134050 A1* | 6/2011 | Harley | 345/173 |
| 2011/0134070 A1* | 6/2011 | Wang et al. | 345/174 |
| 2012/0113014 A1 | 5/2012 | Yilmaz | |

FOREIGN PATENT DOCUMENTS

| | | |
|---|---|---|
| CN | 101776967 | 7/2010 |
| CN | 101866250 | 10/2010 |
| CN | 202230457 | 5/2012 |
| JP | 2010160670 | 7/2010 |
| JP | 2010182027 A | 8/2010 |
| KR | 20090101292 | 9/2009 |
| KR | 20090101292 A | 9/2009 |
| KR | 100942763 | 2/2010 |
| KR | 100942763 B1 | 2/2010 |
| TW | 200742610 | 11/2007 |
| TW | 200951789 | 12/2009 |
| TW | M387317 | 8/2010 |
| WO | 2009035471 | 3/2009 |

\* cited by examiner

CAPACITIVE TOUCH PANEL AND METHOD FOR PRODUCING THE SAME

BACKGROUND OF THE INVENTION

Field of the Invention

The present invention relates to touch sensitive devices, in particular to a capacitive touch panel and a method for producing the same.

Description of the Related Art

Touch panels have been developed rapidly since their first emergence, and now the touch panels are widely applied to varieties of appliances, such as LCD monitors, cell phones, game machines, and so on.

Now, there are many kinds of touch panels, and capacitive-type touch panels are the most popular use in the market. A conventional capacitive touch panel generally includes a cover substrate for protection, two capacitive sensing layers spaced from each other by an insulation medium, and two fabrication substrates supporting each of the capacitive sensing layers respectively. Such construction at least has three substrates for different functions, but that would make the touch panel become very thick.

One way to minimize the thickness of the capacitive touch panel is to use a single capacitive sensing layer in the touch panel. FIG. 37 illustrates a schematic plan view of a conductor pattern structure of a conventional capacitive touch panel. The conductor pattern structure is a single conductive layer including first-axis conductor assemblies (such as first-axis conductor assembly 22) and second-axis conductor assemblies (such as second-axis conductor assembly 24). The single conductive layer is superposed on a cover substrate 10 directly instead of on a fabrication substrate.

The first-axis conductor assembly 22 includes adjacent conductor cells (such as conductor cells 222, 224 shown in FIG. 37) connected by conduction lines (such as conduction line 226). The second-axis conductor assembly 24 also includes adjacent conductor cells (such as conductor cells 242, 244 shown in FIG. 37) connected by conduction lines (such as conduction line 246). There are insulation layers (like insulation layer 30 shown in FIG. 37) set between the conduction lines of the first-axis conductor assemblies and the conduction lines of the second-axis conductor assemblies. But in such arrangement of the conductor assemblies, there are gaps (like gap 112) between the first-axis conductor assemblies and the second-axis conductor assemblies.

FIG. 38 is a schematic principle view showing the light transmitting path taken along a cross-section line A-A' in FIG. 37. Parts of incident rays from outside (like incident rays 102) are only reflected from the surface of the cover substrate 10, generating reflected rays 104. Parts of incident rays from outside (like incident rays 106) are reflected from both the surface of the cover substrate 10 and the surface of the conductor assemblies (such as conductor assemblies 224 shown in FIG. 37), generating reflected rays 108 and reflected rays 110.

The cover substrate 10 and the conductive layer are made from different materials, for example, the cover substrate 10 is made from glass and the conductive layer is made from ITO (indium tin oxide), so the refractive index of the cover substrate 10 is different from that of the conductive layer. Thus the different ways that reflected rays are generated from different part of the touch panel will make the two layer look different and let users readily see the conductor assemblies under the cover substrate.

Thus, it is desired to provide a capacitive touch panel having a single capacitive sensing layer that overcomes the above drawbacks of the conventional capacitive touch panel.

SUMMARY OF THE INVENTION

In one aspect, a capacitive touch panel is provided including a singular substrate; a mask layer formed on a border region of the singular substrate; a capacitive sensing layer comprising a plurality of first-axis conductor assemblies and a plurality of second-axis conductor assemblies, wherein the singular substrate, the mask layer and the capacitive sensing layer are integrally formed; and insulated auxiliary medium filled in gaps between the first-axis conductor assemblies and the second-axis conductor assemblies, wherein the refractive index of the auxiliary medium matches the refractive index of the capacitive sensing layer.

In another aspect, a method for producing a capacitive touch panel is provided including the following steps: providing a singular substrate; disposing a capacitive sensing layer on the singular substrate, the capacitive sensing layer including a plurality of first-axis conductor assemblies and second-axis conductor assemblies defining gaps between the first-axis conductor assemblies and second-axis conductor assemblies; and filling auxiliary materials in the gaps, the auxiliary materials having a refractive index matching a refractive index of the capacitive sensing layer.

Thus, the capacitive touch panel and method can make the capacitive touch panel with a single sensing layer have a uniform appearance and looks more attractive.

DETAILED DESCRIPTION

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components.

Figure 1:
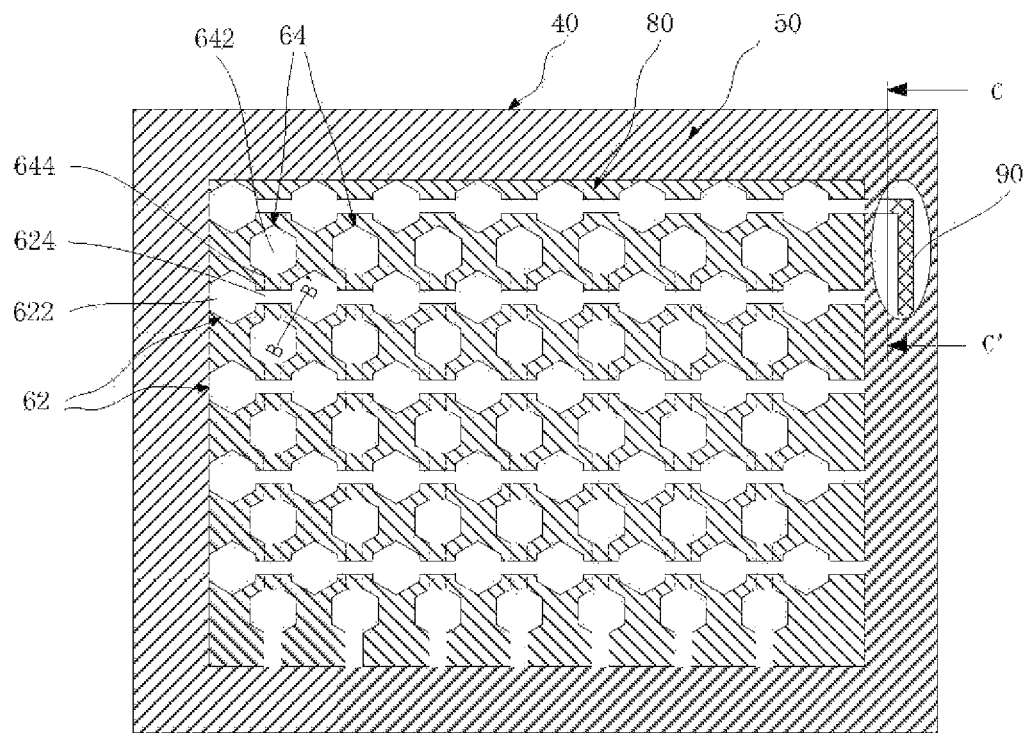
FIG. 1 is a schematic plan view of a capacitive touch panel according to a first embodiment of the present invention.

With reference to FIG. 1 which is a schematic plan view of a capacitive touch panel according to a first embodiment of the present invention, the capacitive touch panel includes a singular substrate 40, a mask layer 50 formed on a border region of the singular substrate 40 and a capacitive sensing layer mostly formed on the middle region that is surrounded by the border region of the singular substrate 40. The singular substrate 40, the mask layer 50 and the capacitive sensing layer are integrally formed. The singular substrate 40 in the present invention could be as a cover substrate for protecting the capacitive sensing layer and a fabrication substrate for supporting the capacitive sensing layer. The mask layer 50 is used for covering the internal structures at the border region of the touch panel and generally includes but not limited to black matrices. In a preferred embodiment, the middle region is a view area of the singular substrate 40.

The capacitive sensing layer includes a plurality of parallel first-axis conductor assemblies (like first-axis conductor assembly 62) and a plurality of second-axis conductor assemblies (like second-axis conductor assembly 64) perpendicular to the first-axis conductor assemblies. Each first-axis conductor assembly includes a plurality of equally-spaced first-axis conductor cells (like first-axis conductor cell 622), each second-axis conductor assembly includes a plurality of equally-spaced second-axis conductor cells (like second-axis conductor cell 642). The shape of the first-axis conductor cells and second-axis conductor cells may be hexagon, diamond or other polygons. The first-axis conductor cells and second-axis conductor cells are separated from each other, forming gaps between the first-axis conductor cells and second-axis conductor cells. The width of the gaps is approximate 30 μm. The capacitive touch panel further includes auxiliary medium 80 filled in the above gaps, the refractive index of the auxiliary medium 80 matches the refractive index of the capacitive sensing layer, so that the capacitive sensing layer can not be seen by users.

For transmitting touch signals, adjacent conductor cells in a same axis are connected by conduction lines (like conduction line 624 in the first-axis assembly and conduction line 644 in the second-axis assembly). The auxiliary medium 80 is insulative and also used to cover the conduction lines 644 so that the conduction lines 622 are insulated from the conduction lines 644.

Figure 2:
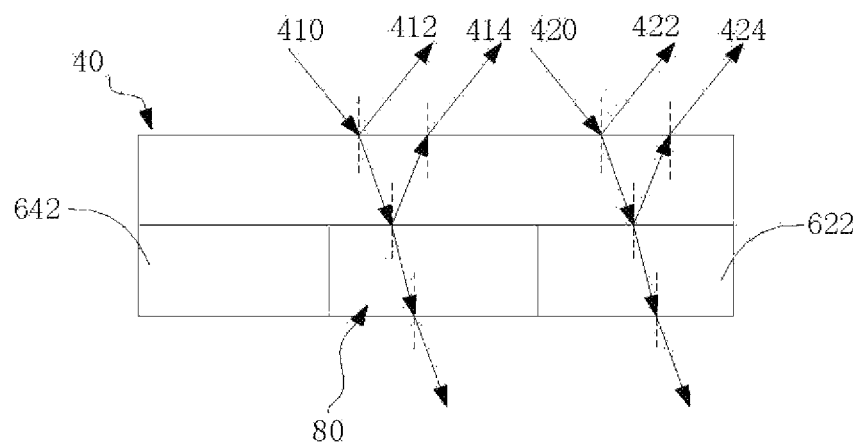
FIG. 2 is a schematic principle view of the light transmitting path taken along a cross-section line B-B' in FIG. 1.

FIG. 2 shows a schematic principle view of the light transmitting path taken along the cross-section line B-B' in FIG. 1. Incident rays 410, for example, are firstly reflected from the surface of the singular substrate 40, generating reflected rays 412 and then being refracted, secondly reflected from the surface of the gap area filled with the auxiliary medium 80, generating reflected rays 414. Incident rays 420 are firstly reflected from the surface of the singular substrate 40, generating reflected rays 422 and then being refracted, secondly reflected from the surface of the conductor assemblies, more detailed, from the surface of a conductor cell 622 of the conductor assembly shown in FIG. 2, generating reflected rays 424. Since the refractive index of the auxiliary medium 80 matches that of the capacitive sensing layer, wherever the incident point is, the incident rays are reflected in the same way. Thus, the touch panel has a uniform appearance, and users can not distinguish the gaps and the conductor assemblies easily, which will prettify the appearance of the touch panel.

Furthermore, the auxiliary medium 80 is formed between the conduction lines 624 and 644, so the conduction lines 622 are insulated from the conduction lines 644. Compared to the conventional touch panels that use insulated layers to implement the above insulating property, the auxiliary medium 80 in the present invention can be used as the insulated layers between the conduction lines 624 and 644, and also can be used as an index-matching layer for those gap areas. Thus, the process of making the touch panel is simplified.

In a preferred embodiment, the refractive index of the auxiliary medium is 1.5~2.1, and the capacitive sensing layer may be made from ITO with refractive index 1.7~1.8. The auxiliary medium is made from transparent materials selected from the group consisting of $SiO_2$ with refractive index 1.5~1.6, $TiO_2$ with refractive index 1.7~1.8, $Nb_2O_5$ with refractive index 2.0~2.1 and transparent insulating resistance with refractive index 1.5~1.6. The capacitive sensing layer is single layered and directly formed on the singular substrate 40, so there is no need to provide two conventional fabrication substrates for supporting the capacitive sensing layer, consequently the thickness of the whole touch panel will be reduced.

Figure 3:
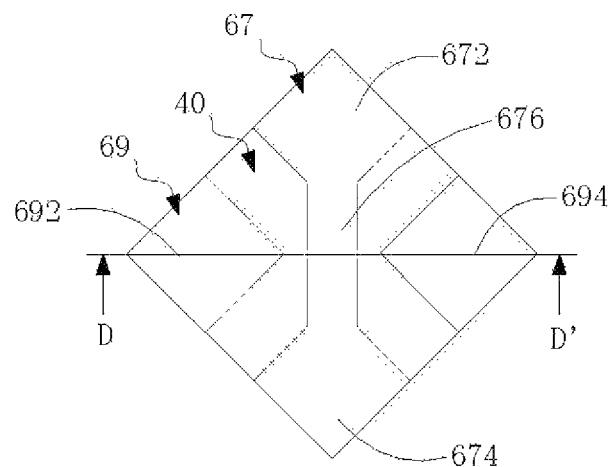
FIG. 3 is a schematic plan view of a raw structure from a capacitive touch panel according to a first preferred embodiment of the present invention.
Figure 4:
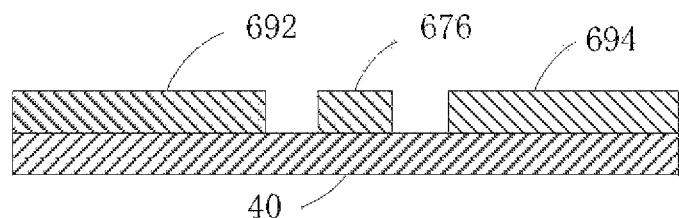
FIG. 4 is a schematic cross-sectional view taken along a cross-section line D-D' in FIG. 3.

According to the present invention, the auxiliary medium 80 is filled in the gaps. The filling process can be implemented by many ways, such as aerosol jet printing, ink jet printing and photolithography. FIG. 3 is a schematic plan view of a raw structure of a part taken from a capacitive touch panel according to the first preferred embodiment of the present invention, and FIG. 4 is a schematic cross-sectional view taken along the cross-section line D-D' in FIG. 3. The first-axis conductor assemblies 69 and the second-axis conductor assemblies 67 of the capacitive touch panel are formed on the singular substrate 40 and include square shaped conductor cells, the conductor cells 692, 694 arranged along the first-axis are not connected, and the conductor cells 672, 674 arranged along the second-axis are electrically connected by a conduction line 676. Conductor cells 672,674 and conductor cells 692,694 are separated from each other, forming gaps between them.

Figure 5:
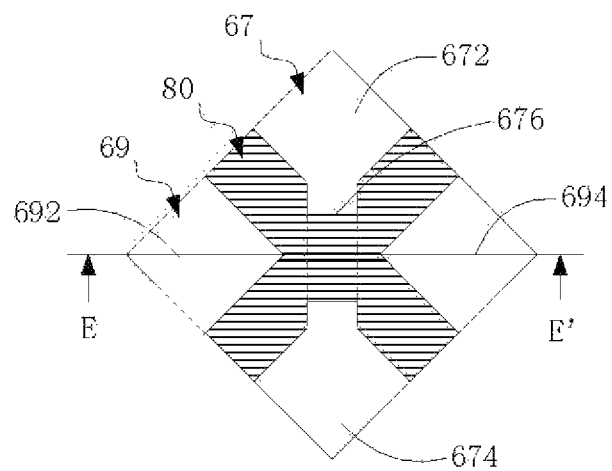
FIG. 5 is a schematic plan view of a raw structure from a capacitive touch panel with a fill-in form.
Figure 6:
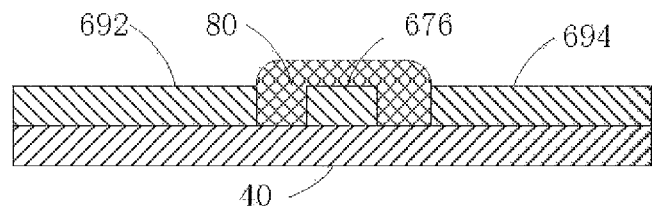
FIG. 6 is a schematic cross-sectional view taken along a cross-section line E-E' in FIG. 5
Figure 7:
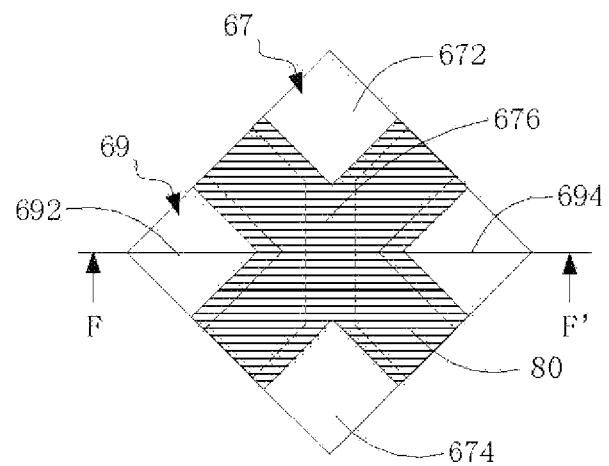
FIG. 7 is a schematic plan view of a raw structure from a capacitive touch panel with a fill-out form.
Figure 8:
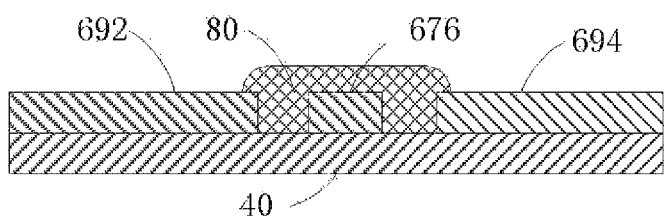
FIG. 8 is a schematic cross-sectional view taken along a cross-section line F-F' in FIG. 7
Figure 9:
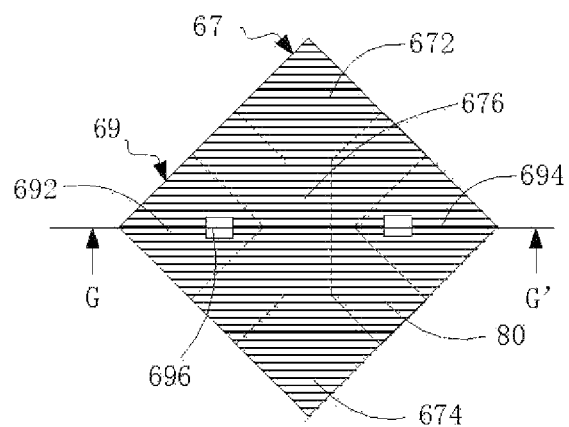
FIG. 9 is a schematic plan view of a raw structure from a capacitive touch panel with a contact hole form.
Figure 10:
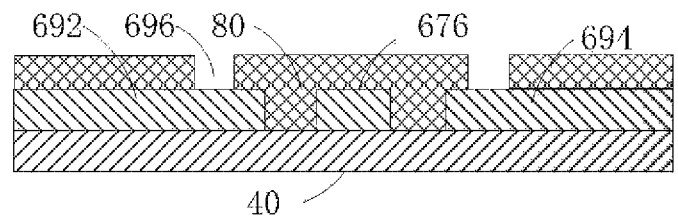
FIG. 10 is a schematic cross-sectional view taken along a cross-section line G-G' in FIG. 9.

After the gaps being filled with the auxiliary medium 80, there are three kinds of filling forms: fill-in, fill-out and contact hole. In the fill-in form, the auxiliary medium 80 can be fit to fill the gaps properly, without spilling from the gaps, as FIG. 5 shows. The auxiliary medium 80 is also formed on the conduction line 676. FIG. 6 is a schematic cross-sectional view taken along the cross-section line E-E' in FIG. 5. In the fill-out form, the auxiliary medium 80 may spill from the gaps and covers part of the conductor cells, as FIG. 7 shows. FIG. 8 is a schematic cross-sectional view taken along the cross-section line F-F' in FIG. 7. In the contact hole forms, as FIG. 9 shows, the auxiliary medium 80 covers almost the whole sensing layer. At least two contact holes 696 are formed in the auxiliary medium 80 for connecting the two conductor cells 692, 694. FIG. 10 is a schematic cross-sectional view taken along the cross-section line G-G' in FIG. 9.

Figure 11:
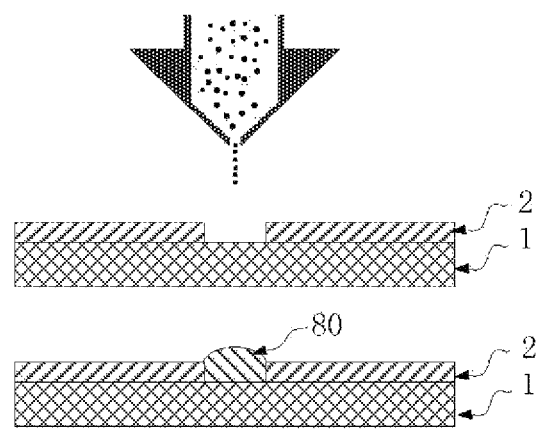
FIG. 11 shows how to fill a gap by the aerosol jetting printing.

There are three ways to fill the gaps with the auxiliary medium. FIG. 11 shows how to fill a gap by the aerosol jetting printing. A touch sensing layer 2 including a gap is formed on a substrate 1. Aerosol jetting printing consists of the step of directing a focused stream of atomized particles towards a substrate. The high velocity of the stream causes the particles to impact on the substrate. Thermal post processing is usually required to sinter the particles together to adhere them to the substrate. The particles are far too small (about 10 μm) compared to the width of gaps.

Figure 12:
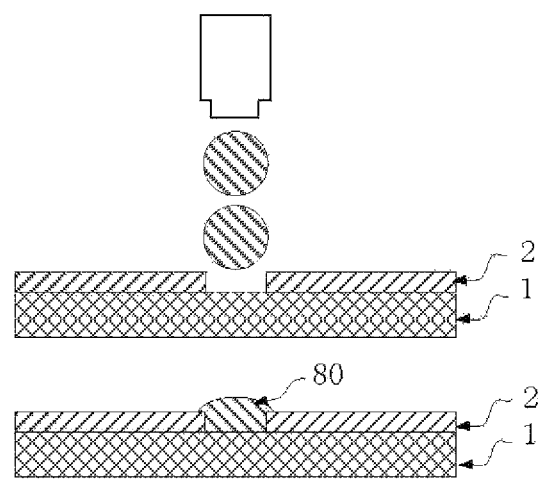
FIG. 12 shows how to fill the gap by ink jetting printing.

FIG. 12 shows how to fill the gap by an ink jetting printing. Ink jetting printing works by propelling individual small droplets of ink towards a substrate. The ink is forced through a small orifice by a variety of means including pressure, heat, and vibration. The liquid droplets usually have diameters bigger than 30 μm.

Figure 13:
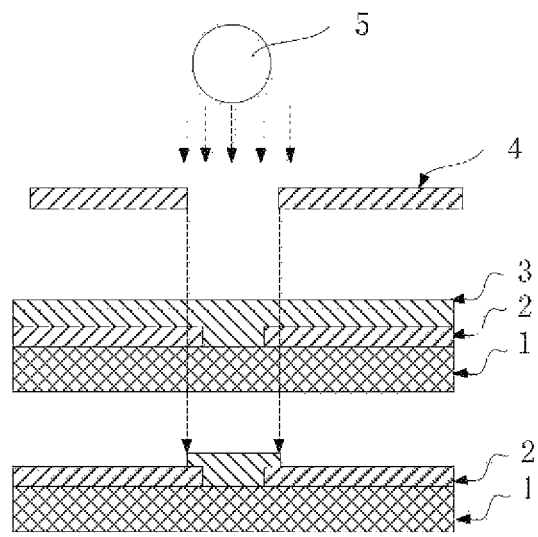
FIG. 13 shows how to fill the gap by photolithography.

FIG. 13 shows how to fill the gap by photolithography. The method firstly forms an auxiliary medium 3 with insulating property and having nearly the same size as the singular substrate 40 on the capacitive sensing layer 2, secondly etches the auxiliary medium 3 by photolithography, only leaving the auxiliary medium filled in the gaps. Mask 4 must be precisely aligned to the gaps and irradiated by light 5 in order to form the auxiliary medium filled in the gaps properly. Because the auxiliary medium 3 forms on the conduction lines as well, another process of forming an insulated layer on the conduction lines can be reduced in this filling process.

After the above filling process, the conductor cells 622 arranged along the first-axis are then electrically connected by conduction lines 624 that cross and insulate with the conduction lines 644, as shown in FIG. 1. The conduction lines 624 can be metal lines or transparent conductive lines. The connection may be implemented by direct contact or contact holes.

Referring to FIG. 1, each conductor assembly is electrically connected to a signal transmission line (like signal transmission line 90) in the border region of the singular substrate 40. The connection can be implemented by adopting at least one way selected from the following: connecting via contact holes, connecting by direct contact and electrically connecting without contact.

In the way of connecting a conductor assembly to a signal transmission line via a contact hole, the contact hole is formed in the mask layer 50.

Figure 14:
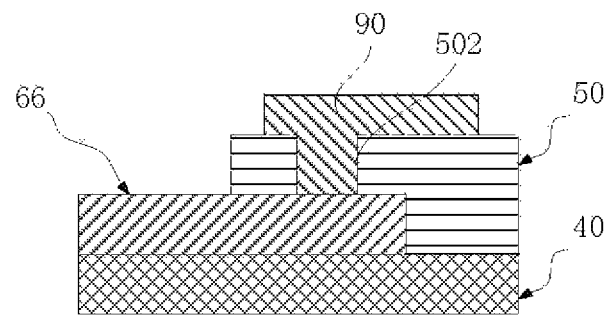
FIG. 14 is a schematic cross-sectional view taken along the cross-section line C-C' in FIG. 1 according to a second embodiment of the present invention.

Referring to FIG. 14, which is a schematic cross-sectional view taken along the cross-section line C-C' in FIG. 1 according to a second embodiment of the present invention. The mask layer 50 covers part of the conductor assembly 66. The contact hole 502 is formed in the mask layer 50. The signal transmission line 90 passes through the contact hole 502 and one end of the signal transmission line 90 contacts the conductor assembly 66.

Figure 15:
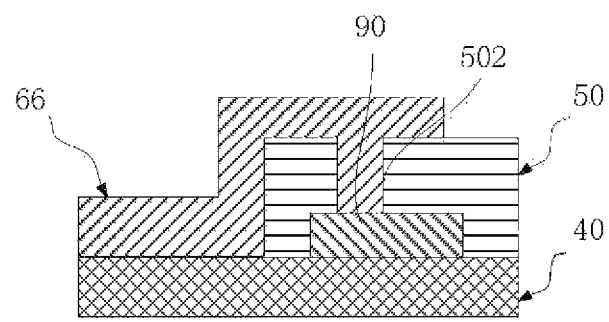
FIG. 15 is schematic cross-sectional view taken along the cross-section line C-C' in FIG. 1 according to a second preferred embodiment of the present invention.

FIG. 15 is a schematic cross-sectional view taken along the cross-section line C-C' in FIG. 1 according to the second preferred embodiment of the present invention. In this embodiment, the mask layer 50 covers the signal transmission line 90, the contact hole 502 is formed in the mask layer 50. The conductor assembly 66 passes through the contact hole 502 and one end of the conductor assembly 66 contacts the signal transmission line 90. There may be more contact holes in the mask layer 50, and the shape of each contact hole may be rectangular, circular or polygon.

In the way of connecting a conductor assembly to a signal transmission line by direct contact, the conductor assembly directly contacts the signal transmission line.

Figure 16:
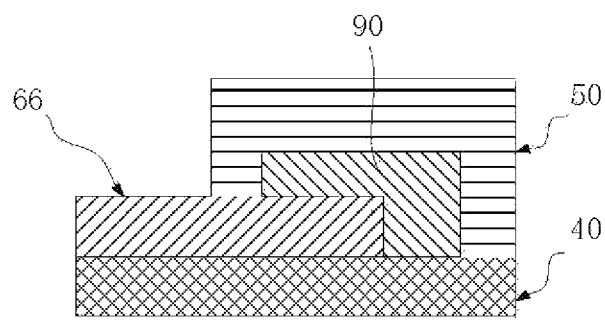
FIG. 16 is a schematic cross-sectional view taken along the cross-section line C-C' in FIG. 1 according to a third embodiment of the present invention.

Referring to FIG. 16, which is a schematic cross-sectional view taken along the cross-section line C-C' in FIG. 1 according to a third embodiment of the present invention.

The conductor assembly 66 directly contacts the signal transmission line 90 and both of the conductor assembly 66 and the signal transmission line 90 are covered by the mask layer 50 in the border region, wherein the signal transmission line 90 overlaps the conductor assembly 66.

Figure 17:
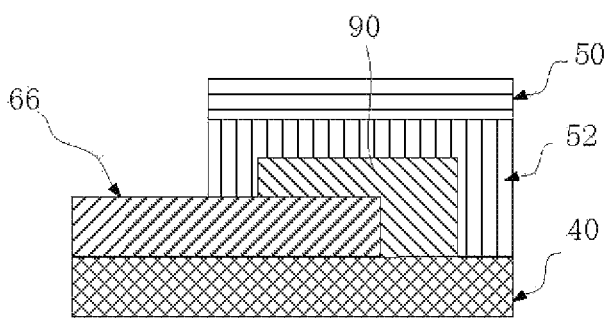
FIG. 17 is a schematic cross-sectional view taken along the cross-section line C-C' in FIG. 1 according to a third preferred embodiment of the present invention.

FIG. 17 is a schematic cross-sectional view taken along the cross-section line C-C' in FIG. 1 according to the third preferred embodiment of the present invention, the partial conductor assembly 66 and the signal transmission line 90 are successively covered by a transparent dielectric layer 52 and mask layer 50 in case the mask layer 50 being conductive, wherein the signal transmission line 90 overlaps the conductor assembly 66.

Figure 18:
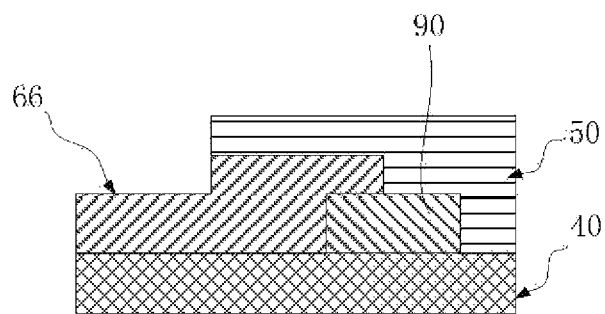
FIG. 18 is a schematic cross-sectional view taken along the cross-section line C-C' in FIG. 1 according to an alternative of the third embodiment of the present invention.

FIG. 18 is a schematic cross-sectional view taken along the cross-section line C-C' in FIG. 1 according to an alternative of the third embodiment of the present invention, in this embodiment, the contact has other forms. The conductor assembly 66 directly contacts the signal transmission line 90. Both the conductor assembly 66 and the signal transmission line 90 are covered by the mask layer 50 in the border region, wherein the conductor assembly 66 overlaps the signal transmission line 90. The transparent dielectric layer 52 also can be added above the conductor assembly 66 and the signal transmission line 90 and under the mask layer 50 in case the mask layer 50 being conductive, the dielectric layer 52 covers both the partial conductor assembly 66 and the signal transmission line 90 and is disposed under the mask layer 50, as FIG. 19 shows.

Figure 19:
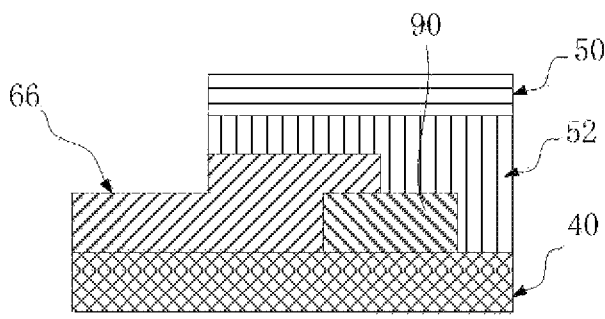
FIG. 19 is a schematic cross-sectional view taken along the cross-section line C-C' in FIG. 1 according to another alternative of the third embodiment of the present invention.

The difference between the embodiments shown in FIG. 16 and FIG. 18 and the difference between the embodiments shown in FIG. 17 and FIG. 19 are the forming sequence of the conductor assembly 66 and the signal transmission line 90, wherein as shown in FIG. 16 and FIG. 18, the conductor assembly 66 firstly is formed on the singular substrate 40 and then the signal transmission line 90 is formed to overlap part of the conductor assembly 66, and as shown in FIG. 18 and FIG. 19, the signal transmission line 90 firstly is formed on the singular substrate 40 and then the conductor assembly 66 is formed to overlap part of the signal transmission line 90.

Figure 20:
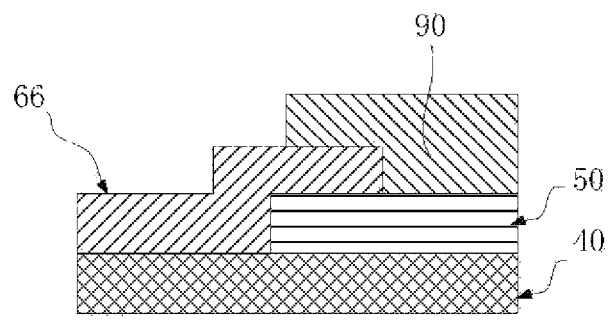
FIG. 20 is a schematic cross-sectional view taken along the cross-section line C-C' in FIG. 1 according to a forth embodiment of the present invention.
Figure 21:
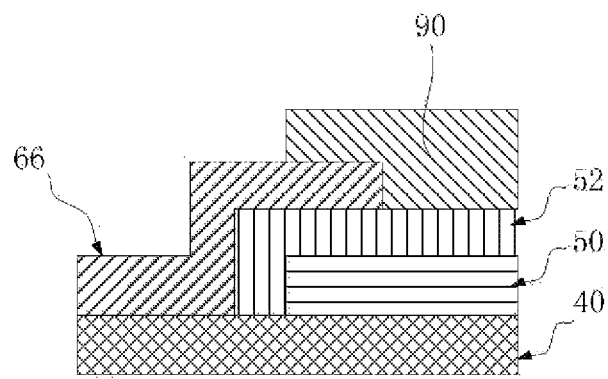
FIG. 21 is a schematic cross-sectional view taken along the cross-section line C-C' in FIG. 1 according to a forth preferred embodiment of the present invention.

Referring to FIG. 20, which is a schematic cross-sectional view taken along the cross-section line C-C' in FIG. 1 according to a forth embodiment of the present invention. The conductor assembly 66 directly contacts the signal transmission line 90 and both are arranged over the mask layer 50 in the border region, wherein the signal transmission line 90 overlaps the conductor assembly 66. FIG. 21 is a schematic cross-sectional view taken along the cross-section line C-C' in FIG. 1 according to the forth preferred embodiment of the present invention, the conductor assembly 66 and the signal transmission line 90 are arranged over a transparent dielectric layer 52 that covers the mask layer 50 in case the mask layer 50 being conductive.

Figure 22:
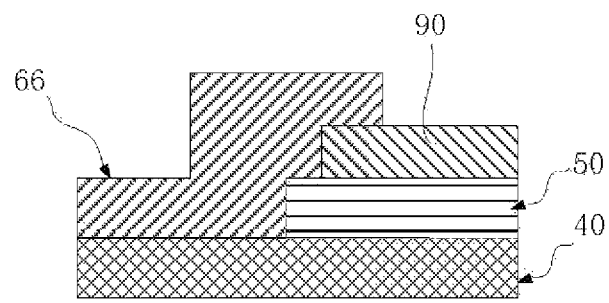
FIG. 22 is a schematic cross-sectional view taken along the cross-section line C-C' in FIG. 1 according to an alternative of the forth embodiment of the present invention.

FIG. 22 is a schematic cross-sectional view taken along the cross-section line C-C' in FIG. 1 according to an alternative of the forth embodiment of the present invention. The conductor assembly 66 directly contacts the signal transmission line 90. Both the conductor assembly 66 and signal transmission line 90 are arranged over the mask layer 50 in the border region, wherein the conductor assembly 66 overlaps the signal transmission line 90 and is placed over the signal transmission line 90. The transparent dielectric layer 52 also can be added above the mask layer 50 to isolate the conductor assembly 66 and the signal transmission line 90 from the mask layer 50 in case the mask layer 50 being conductive, as FIG. 23 shows.

Figure 23:
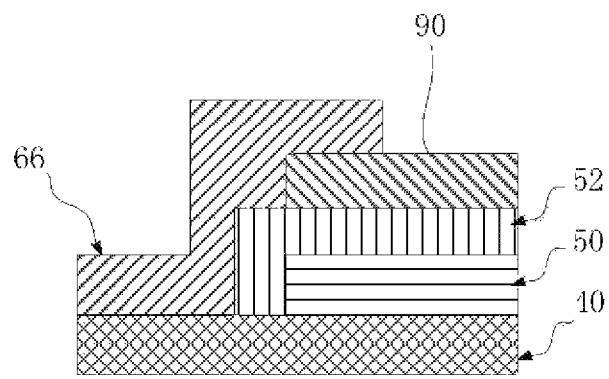
FIG. 23 is a schematic cross-sectional view taken along the cross-section line C-C' in FIG. 1 according to another alternative of the forth embodiment of the present invention.

The difference between the embodiments shown in FIG. 20 and FIG. 22 and the difference between the embodiments shown in FIG. 21 and FIG. 23 are the forming sequence of the conductor assembly 66 and the signal transmission line 90.

Figure 24:
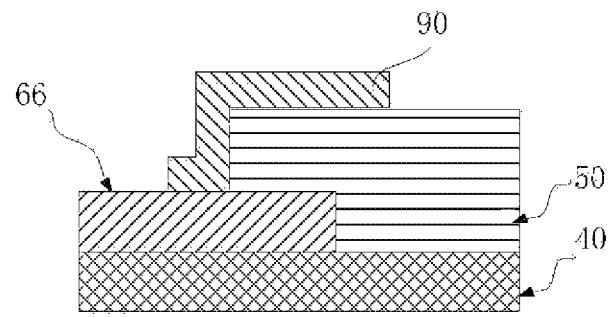
FIG. 24 is a schematic cross-sectional view taken along the cross-section line C-C' in FIG. 1 according to a fifth embodiment of the present invention.
Figure 25:
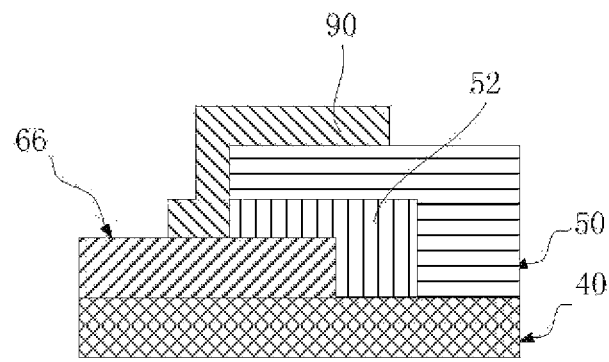
FIG. 25 is a schematic cross-sectional view taken along the cross-section line C-C' in FIG. 1 according to a fifth preferred embodiment of the present invention.
Figure 26:
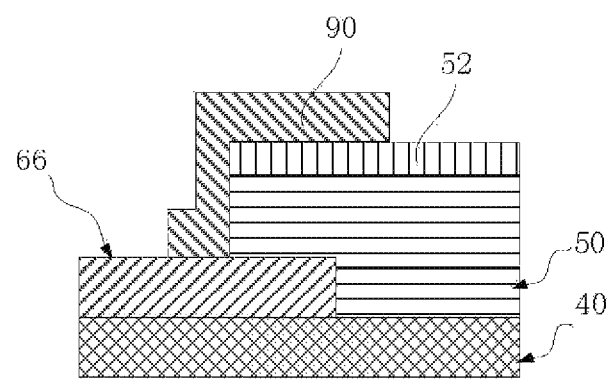
FIG. 26 is a schematic cross-sectional view taken along the cross-section line C-C' in FIG. 1 according to a fifth alternative embodiment of the present invention.

In other embodiments, all the direct contact between the conductor assembly 66 and the signal transmission line 90 can be in the view area other than the border region. FIG. 24 is a schematic cross-sectional view taken along the cross-section line C-C' in FIG. 1 according to a fifth embodiment of the present invention. The conductor assembly 66 is placed on the singular substrate 40, the mask layer 50 overlaps the conductor assembly 66, part of the signal transmission line 90 directly contacts the conductor assembly 66 in the view area and the other part of the signal transmission line 90 overlaps the mask layer 50 in the border area. At the base of the fifth embodiment, as FIG. 25 shows, a transparent dielectric layer 52 is disposed between the conductor assembly 66 and the mask layer 50 in case the mask layer 50 being conductive. Alternately, as FIG. 26 shows, the transparent dielectric layer 52 is disposed between the mask layer 50 and the signal transmission line 90 in case the mask layer 50 being conductive.

Figure 27:
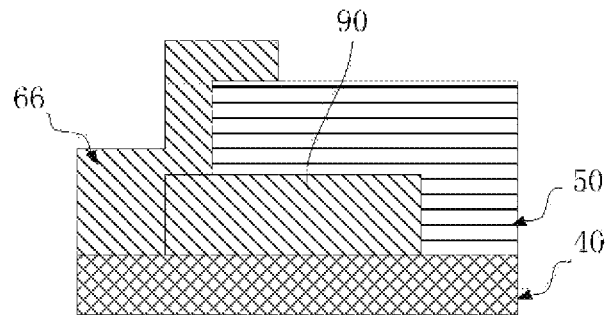
FIG. 27 is a schematic cross-sectional view taken along the cross-section line C-C' in FIG. 1 according to a sixth embodiment of the present invention.
Figure 28:
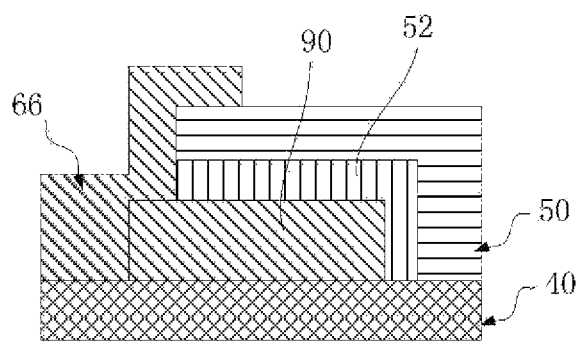
FIG. 28 is a schematic cross-sectional view taken along the cross-section line C-C' in FIG. 1 according to a sixth preferred embodiment of the present invention.
Figure 29:
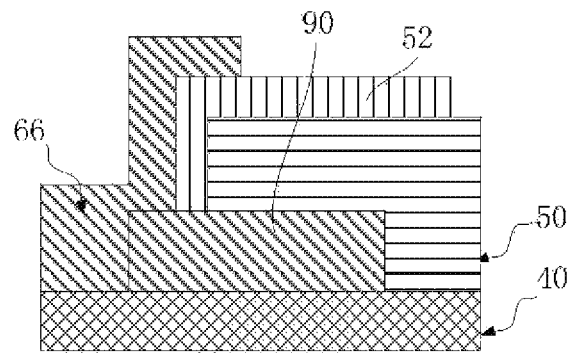
FIG. 29 is a schematic cross-sectional view taken along the cross-section line C-C' in FIG. 1 according to a sixth alternative embodiment of the present invention.

FIG. 27 is a schematic cross-sectional view taken along the cross-section line C-C' in FIG. 1 according to a sixth embodiment of the present invention. The signal transmission line 90 is disposed on the singular substrate 40, part of the signal transmission line 90 is in the border region and covered by the mask layer 50, the other part of the signal transmission line 90 is in the view area and covered by the conductor assembly 66. The conductor assembly 66 directly contacts the signal transmission line 90 is in the view area and overlaps the mask layer 50 in the border region. At the base of the sixth embodiment, as FIG. 28 shows, a transparent dielectric layer 52 is disposed between the mask layer 50 and the signal transmission line 90 in case the mask layer 50 being conductive. Alternately, as FIG. 29 shows, the transparent dielectric layer 52 is disposed between the conductor assembly 66 and the mask layer 50 in case the mask layer 50 being conductive.

In the above embodiments, the material of the transparent dielectric layer is selected from the group consisting of silicon, silicon oxide and silicon nitride.

Figure 30:
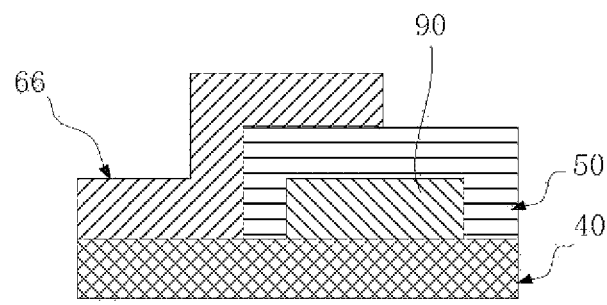
FIG. 30 is a schematic cross-sectional view taken along the cross-section line C-C' in FIG. 1 according to a seventh embodiment of the present invention.

In the way of connecting a conductor assembly to a signal transmission line without contact, the conductor assembly is separated from the signal transmission line by the mask layer. FIG. 30 is a schematic cross-sectional view of a seventh embodiment of the present invention. The signal transmission line 90 is completely covered by the mask layer 50, the conductor assembly 66 overlaps the mask layer 50 where the overlapped part of the mask layer 50 also contacts the signal transmission line 90. The mask layer 50 may be made of aeolotropic materials, that is, the mask layer 50 are conductive in specified direction (such in Y direction) because the resistivity of the mask layer 50 in the X direction or in other directions is still high, the mask layer 50 can be regarded as non-conductive in these non-specified directions. In this embodiment, the mask layer 50 conducts in the direction of connecting the conductor assembly 66 and the signal transmission line 90 so that the conductor assembly 66 can electrically connect to the signal transmission line 90 by the mask layer 50.

Figure 31:
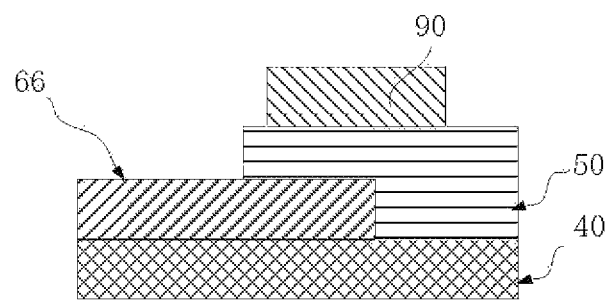
FIG. 31 is a schematic cross-sectional view taken along the cross-section line C-C' in FIG. 1 according to a seventh alternative embodiment of the present invention.

In an alternative embodiment, as FIG. 31 shows, part of the conductor assembly 66 is covered by the mask layer 50; the signal transmission line 90 is placed isolate over the mask layer 50. The conductor assembly 66, mask layer 50 and the signal transmission line 90 have common overlapped parts with conduction due to the mask layer 50 may be made of aeolotropic materials.

Figure 32:
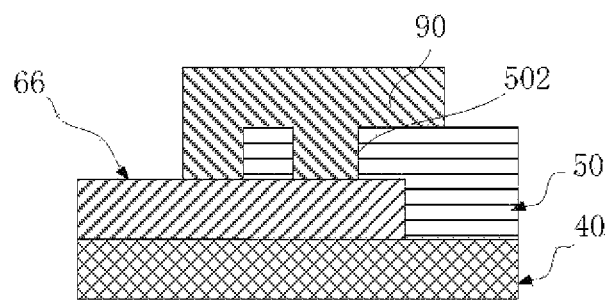
FIG. 32 is a schematic cross-sectional view taken along the cross-section line C-C' in FIG. 1 according to an eighth embodiment of the present invention.
Figure 33:
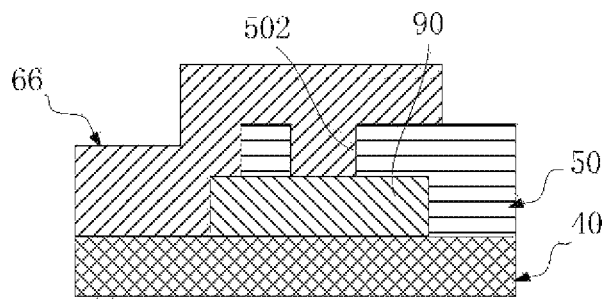
FIG. 33 is a schematic cross-sectional view taken along the cross-section line C-C' in FIG. 1 according to an eighth alternative embodiment of the present invention.

Two or more kinds of above mentioned connecting way can be used together. FIG. 32 is a schematic cross-sectional view taken along the cross-section line C-C' in FIG. 1 according to an eighth embodiment of the present invention. The conductor assembly 66 is disposed on the singular substrate 40, the mask layer 50 overlaps the conductor assembly 66 with the overlapped part having contact holes 502. The signal transmission line 90 directly contacts the conductor assembly 66 by being directly disposed on the conductor assembly 66 as well as passing through the contact holes 502 to contact the conductor assembly 66. FIG. 33 is an alternative schematic cross-sectional view taken along the cross-section line C-C' in FIG. 1 according to an eighth embodiment of the present invention. The signal transmission line 90 is formed on the singular substrate 40, the mask layer 50 overlaps the signal transmission line 90 with the overlapped part having contact holes 502, The conductor assembly 66 contacts the signal transmission line 90 by being directly disposed on the part of the transmission line 90 that is not covered by the mask layer 50. The conductor assembly 66 also passes through the contact holes 502 to contact the part of the signal transmission line 90 that is covered by the mask layer 50. The difference between the embodiments shown in FIG. 32 and FIG. 33 is the forming sequence of the conductor assembly 66 and the signal transmission line 90.

All the above described embodiments are single-side configurations, that is, the mask layer, conductor assemblies, signal transmission lines, etc. are disposed on only one side of the singular substrate 40. Besides the single-side configurations, there are double-sides configurations.

Figure 34:
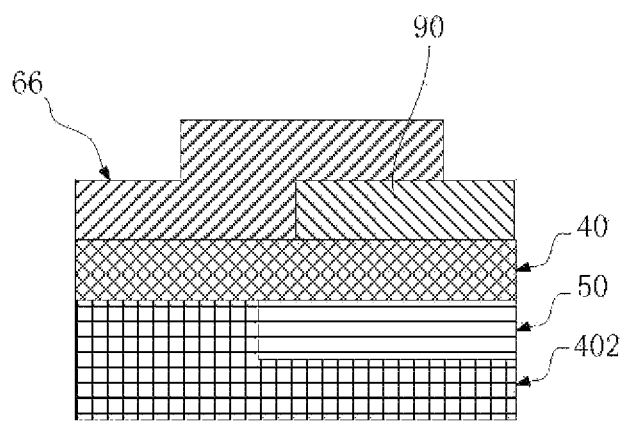
FIG. 34 is a schematic cross-sectional view taken along the cross-section line C-C' in FIG. 1 according to a ninth embodiment of the present invention.

Referring to FIG. 34 which is an alternative schematic cross-sectional view taken along the cross-section line C-C' in FIG. 1 according to a ninth embodiment of the present invention, the conductor assembly 66 and the signal transmission line 90 are disposed on one side of the singular substrate 40, and the mask layer 50 corresponding to a border region is disposed on the other side of the singular substrate 40. A transparent passivation layer 402 is formed on the singular substrate 40 with the same side of the mask layer 50 and also covers the mask layer 50. The transparent passivation layer 402 is used for anti-glare and/or anti-reflection. The conductor assembly 66 connects to the signal transmission line 90 by direct contact, which is illustrated as the conductor assembly 66 overlapping the signal transmission line 90.

Figure 35:
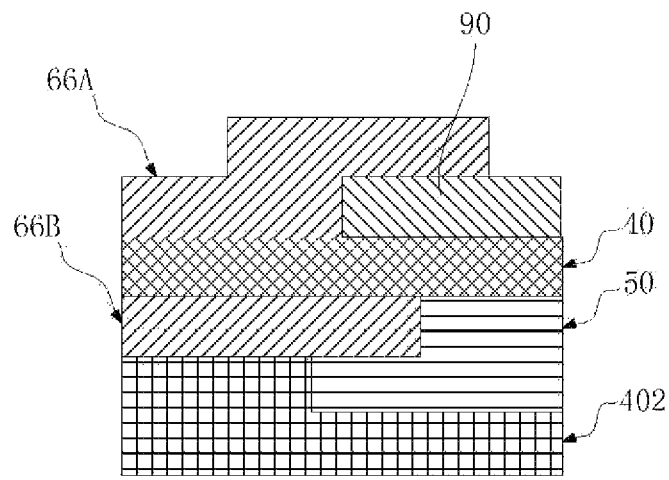
FIG. 35 is a schematic cross-sectional view taken along the cross-section line C-C' in FIG. 1 according to a ninth alternative embodiment of the present invention.
Figure 36:
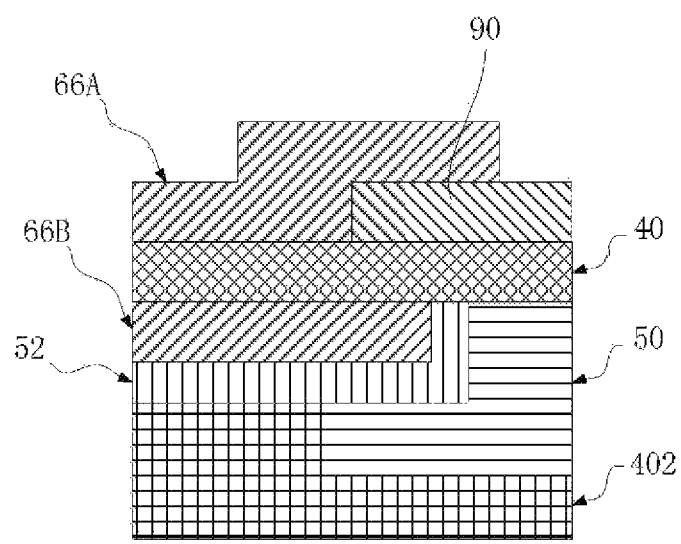
FIG. 36 is a schematic cross-sectional view taken along the cross-section line C-C' in FIG. 1 according to a ninth preferred embodiment of the present invention.
Figure 37:
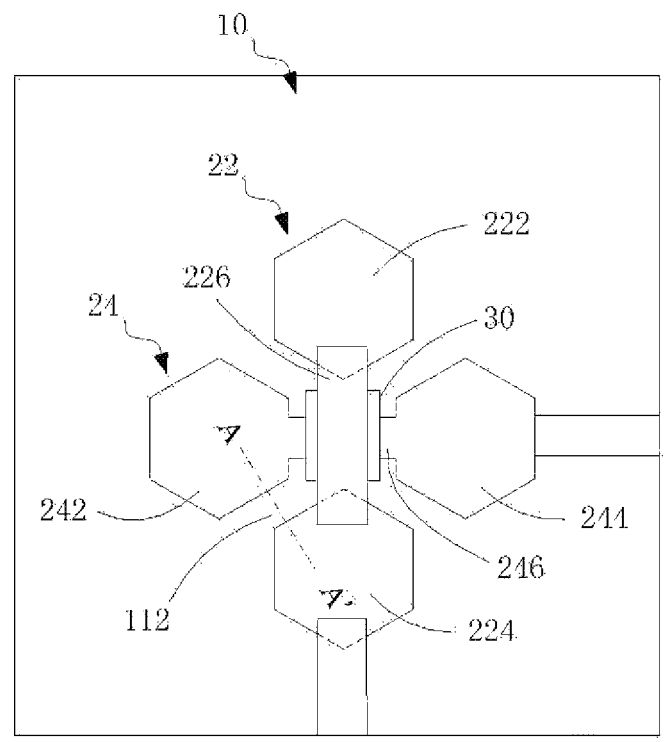
FIG. 37 illustrates a schematic plan view of a conductor pattern structure of a conventional capacitive touch panel.
Figure 38:
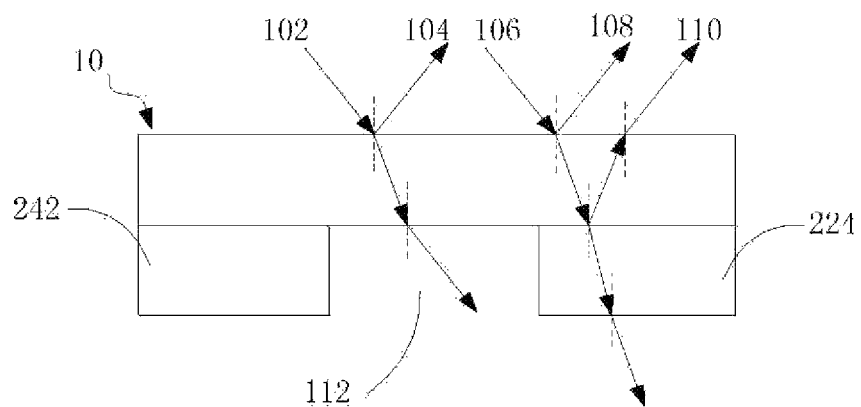
FIG. 38 is a principle view showing the light transmitting path taken along a cross-section line A-A' in FIG. 34.

Alternately, the conductor assemblies may be disposed on both sides of the singular substrate 40s, as FIG. 35 shows. FIG. 35 is a schematic cross-sectional view taken along the cross-section line C-C' in FIG. 1 according to a ninth alternative embodiment of the present invention. The conductor assembly 66A and the signal transmission line 90 are disposed on one side of the singular substrate 40, and a conductor assembly 66B is disposed on the other side of the singular substrate 40. The conductor assembly 66B extends to a border region and is overlapped by the mask layer 50. A transparent passivation layer 402 is formed with the same side of the mask layer 50 and covers the conductor assembly 66B and the mask layer 50. The conductor assembly 66A connects to the signal transmission line 90 by direct contact, which is illustrated as the conductor assembly 66A overlapping the signal transmission line 90. In a preferred embodiment, a transparent dielectric layer 52 may be added between the mask layer 50 and the conductor assembly 66B in case the mask layer 50 being conductive, as FIG. 36 shows.

In the above double side configurations, the direct contact form is: the conductor assembly 66 overlapping the signal transmission line 90. In fact, the direct contact form also can be: the signal transmission line 90 overlapping the conductor assembly 66.

The material of the capacitive sensing layer is selected from the group consisting of ITO, TCO, conductive polymer, CNTs, and other similar materials. The material of the mask layer is selected from the group consisting of black photoresist, black resin, black ink, and other similar material with other colors.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A capacitive touch panel, comprising:
   a singular substrate;
   a mask layer formed on a border region of the singular substrate;
   a capacitive sensing layer comprising:
      a plurality of first-axis conductor assemblies; and
      a plurality of second-axis conductor assemblies, wherein:
         each first-axis conductor assembly of the plurality of first-axis conductor assemblies has a plurality of first-axis conductor cells and each second-axis conductor assembly of the plurality of second-axis conductor assemblies has a plurality of second-axis conductor cells,
         the plurality of first-axis conductor cells and the plurality of second-axis conductor cells are formed on a same layer of the singular substrate,
         the mask layer and the capacitive sensing layer are integrally formed,
         a gap is defined between a first sidewall of a first first-axis conductor cell of the plurality of first-axis conductor cells and a second sidewall of a first second-axis conductor cell of the plurality of second-axis conductor cells, the second sidewall facing the first sidewall,
         a contact hole is formed in the mask layer,
         a signal transmission line in the border region passes through the contact hole, and
         one end of the signal transmission line contacts a conductor assembly of one of the plurality of first-axis conductor assemblies or one of the plurality of second-axis conductor assemblies; and
   an insulated auxiliary medium filling the gap, wherein:
      the insulated auxiliary medium extends from a first edge of the first first-axis conductor cell at which the first sidewall intersects a third sidewall of the first first-axis conductor cell to a second edge of the first first-axis conductor cell at which the first sidewall intersects a fourth sidewall of the first first-axis conductor cell, and
      a refractive index of the insulated auxiliary medium matches a refractive index of the capacitive sensing layer.

2. The capacitive touch panel according to claim 1, wherein the singular substrate is a cover substrate for protecting the capacitive sensing layer and a fabrication substrate for supporting the capacitive sensing layer.

3. The capacitive touch panel according to claim 1, wherein the mask layer comprises black matrices.

4. The capacitive touch panel according to claim 1, wherein the insulated auxiliary medium is selected from the group consisting of $SiO_2$ and $TiO_2$.

5. The capacitive touch panel according to claim 1, wherein the insulated auxiliary medium is a transparent insulating material.

6. The capacitive touch panel according to claim 1, wherein the plurality of first-axis conductor cells are equally spaced, the plurality of second-axis conductor cells are equally spaced, adjacent conductor cells in a same axis are connected by conduction lines, and the insulated auxiliary medium covers the conduction lines extending along a second-axis.

7. The capacitive touch panel according to claim 1, wherein the conductor assembly of one of the plurality of first-axis conductor assemblies or one of the plurality of second-axis conductor assemblies directly contacts the signal transmission line in the border region and both the conductor assembly and the signal transmission line are covered by the mask layer in the border region.

8. The capacitive touch panel according to claim 7, wherein the conductor assembly and the signal transmission line are successively covered by a transparent dielectric layer and the mask layer.

9. The capacitive touch panel according to claim 8, wherein a material of the transparent dielectric layer is selected from a group consisting of silicon, silicon oxide and silicon nitride.

10. The capacitive touch panel according to claim 1, wherein the conductor assembly of one of the plurality of first-axis conductor assemblies or one of the plurality of second-axis conductor assemblies directly contacts the signal transmission line in the border region and both the conductor assembly and the mask layer are covered by the signal transmission line.

11. The capacitive touch panel according to claim 10, wherein the conductor assembly is covered by a transparent dielectric layer disposed under the mask layer.

12. The capacitive touch panel according to claim 1, wherein the mask layer is aeolotropic and disposed sot between the conductor assembly of one of the plurality of first-axis conductor assemblies or one of the plurality of second-axis conductor assemblies and the signal transmission line in the border region.

13. The capacitive touch panel according to claim 2, wherein each conductor assembly of the plurality of first-axis conductor assemblies and the plurality of second-axis conductor assemblies is connected to part of the signal transmission line in a view area of the singular substrate by direct contact.

14. The capacitive touch panel according to claim 1, wherein each conductor assembly of the plurality of first-axis conductor assemblies and the plurality of second-axis conductor assemblies is connected to the signal transmission line in the border region as a double side configuration comprising:
the conductor assembly; and
the signal transmission line being disposed on a first-side of the singular substrate, the mask layer corresponding to the border region being disposed on a second-side of the singular substrate opposite the first side, and a transparent passivation layer being formed on the singular substrate from the second side and also covering the mask layer.

15. The capacitive touch panel according to claim 1, wherein each conductor assembly of the plurality of first-axis conductor assemblies and the plurality of second-axis conductor assemblies is connected to the signal transmission line in the border region as a double side configuration comprising:
the conductor assembly; and
the signal transmission line being disposed on a first side of the singular substrate, the conductor assembly being disposed on a second side of the singular substrate opposite the first side, the conductor assembly extending to the border region and being overlapped by the mask layer, and a transparent passivation layer being formed on the second side and covering the conductor assembly and the mask layer.

16. The capacitive touch panel according to claim 15, further comprising a transparent dielectric layer between the mask layer and the conductor assembly.

17. The capacitive touch panel according to claim 1, wherein a material of the capacitive sensing layer is selected from a group consisting of indium tin oxide (ITO), transparent conductive oxide (TCO), conductive polymer and carbon nanotube (CNTs).

18. The capacitive touch panel according to claim 1, wherein a material of the mask layer is selected from a group consisting of black photoresist, black resin and black ink.

19. The capacitive touch panel according to claim 1, wherein the conductor assembly of one of the plurality of first-axis conductor assemblies or one of the plurality of second-axis conductor assemblies directly contacts the signal transmission line in the border region and wherein both the mask layer and the signal transmission line are covered by the conductor assembly.

20. The capacitive touch panel according to claim 19, wherein the signal transmission line is covered by a transparent dielectric layer disposed under the mask layer.

21. The capacitive touch panel according to claim 1, wherein:
each first-axis conductor cell of the plurality of first-axis conductor cells has a first surface facing the singular substrate and a second surface opposite to the first surface,
each second-axis conductor cell of the plurality of second-axis conductor cells has a third surface facing the singular substrate and a fourth surface opposite to the third surface, and
the insulated auxiliary medium is disposed on a surface of the singular substrate without covering the second surface and the fourth surface.

22. The capacitive touch panel according to claim 1, wherein the insulated auxiliary medium is disposed on a surface of the singular substrate covering edges of the plurality of first-axis conductor cells and the plurality of second-axis conductor cells.

23. The capacitive touch panel according to claim 1, wherein:
each first-axis conductor cell of the plurality of first-axis conductor cells has a first surface facing the singular substrate and a second surface opposite to the first surface, and
the insulated auxiliary medium overlies a majority of the second surface.

24. The capacitive touch panel according to claim 1, wherein the insulated auxiliary medium is a homogeneous material.

25. The capacitive touch panel according to claim 1, wherein the insulated auxiliary medium is selected from a group consisting of $SiO_2$ (silicon oxide) with a refractive index of about 1.5 to 1.6, $TiO_2$ (titanium dioxide) with a refractive index of about 1.7 to 1.8, $Nb_2O_5$ (Niobium pentoxide) with a refractive index of about 2.0 to 2.1 and a transparent insulating material with a refractive index of about 1.5 to 1.6.

26. A capacitive touch panel, comprising:
a singular substrate;
a mask layer formed on a border region of the singular substrate;
a capacitive sensing layer comprising:
  a plurality of first-axis conductor assemblies; and
  a plurality of second-axis conductor assemblies, wherein:
    each first-axis conductor assembly of the plurality of first-axis conductor assemblies has a plurality of first-axis conductor cells and each second-axis conductor assembly of the plurality of second-axis conductor assemblies has a plurality of second-axis conductor cells,
    the plurality of first-axis conductor cells and the plurality of second-axis conductor cells are formed on a same layer of the singular substrate,
    the mask layer and the capacitive sensing layer are integrally formed,
    a gap is defined between a first sidewall of a first first-axis conductor cell of the plurality of first-axis conductor cells and a second sidewall of a first second-axis conductor cell of the plurality of second-axis conductor cells, the second sidewall facing the first sidewall,
    a contact hole is formed in the mask layer,
    a conductor assembly of one of the plurality of first-axis conductor assemblies or one of the plurality of second-axis conductor assemblies passes through the contact hole, and
    one end of the conductor assembly contacts a signal transmission line in the border region; and
an insulated auxiliary medium filling the gap, wherein:
  the insulated auxiliary medium extends from a first edge of the first first-axis conductor cell at which the first sidewall intersects a third sidewall of the first first-axis conductor cell to a second edge of the first first-axis conductor cell at which the first sidewall intersects a fourth sidewall of the first first-axis conductor cell, and
  a refractive index of the insulated auxiliary medium matches a refractive index of the capacitive sensing layer.

* * * * *